United States Patent [19]

Onwumere et al.

[11] Patent Number: 5,354,808
[45] Date of Patent: Oct. 11, 1994

[54] POLYURETHANES INCLUDING PENDANT HINDERED AMINES AND COMPOSITIONS INCORPORATING SAME

[75] Inventors: Fidelis C. Onwumere, Woodbury; Kurt C. Frisch, Jr., Fridley, both of Minn.

[73] Assignee: Minnesota Mining and Manufacturing Company, St. Paul, Minn.

[21] Appl. No.: 986,801

[22] Filed: Dec. 8, 1992

[51] Int. Cl.$^5$ .................................... C08G 18/12
[52] U.S. Cl. .................................... 524/837; 524/838; 528/26; 528/28; 528/901; 525/453; 525/459
[58] Field of Search ............... 528/26, 28, 901; 524/591, 588, 837, 838; 525/459, 453

[56] References Cited

U.S. PATENT DOCUMENTS

| | | | |
|---|---|---|---|
| 3,253,941 | 5/1966 | Finn et al. | 427/155 |
| 3,431,209 | 3/1969 | Rosenfeld | 252/118 |
| 3,632,557 | 1/1972 | Brode et al. | 528/28 |
| 3,903,052 | 9/1975 | Wagner et al. | 528/21 |
| 3,979,344 | 9/1976 | Bryant et al. | 428/442 |
| 3,983,291 | 9/1976 | Chang | 428/290 |
| 4,020,043 | 4/1977 | Siefken | 528/23 |
| 4,077,896 | 3/1978 | Bunegar et al. | 252/544 |
| 4,222,925 | 9/1980 | Bryant et al. | 524/589 |
| 4,345,053 | 8/1982 | Rizk et al. | 525/440 |
| 4,348,292 | 9/1982 | Gian | 252/153 |
| 4,567,228 | 1/1986 | Gaa et al. | 524/588 |
| 4,587,030 | 5/1986 | Casey | 252/92 |
| 4,598,131 | 7/1986 | Prucnal | 525/440 |
| 4,628,076 | 12/1986 | Chang et al. | 525/440 |
| 5,041,494 | 8/1991 | Franke et al. | 528/28 |
| 5,061,393 | 10/1991 | Linares et al. | 252/170 |
| 5,073,195 | 12/1991 | Cuthbert et al. | 106/2 |
| 5,080,822 | 7/1992 | VanEenam | 252/153 |

FOREIGN PATENT DOCUMENTS 58-185700 10/1983 Japan.
90/10026 9/1990 PCT Int'l Appl..

*Primary Examiner*—John Kight, III
*Assistant Examiner*—Rachel Johnson
*Attorney, Agent, or Firm*—Gary L. Griswold; Walter N. Kirn; Jeffrey L. Wendt

[57] ABSTRACT

Ungelled, aqueous dispersions of silane-terminated partially crosslinked polyurethane polymers are described which are the reaction product of A) an isocyanate-containing prepolymer formed from: (i) a molar excess of organic polyisocyanate sufficient to promote substantially equal access to isocyanate groups; (ii) active hydrogen-containing material; (iii) sterically hindered amines; (iv) emulsifying monomer; B) chain-extending monomer; C) an organic compound having a pKb of at most about 7; and D) a silane coupling agent represented by the general formula $ASi(OR^2)_3$ and present in an amount sufficient to partially crosslink the polyurethane resin but insufficient to gel the dispersion, provide advantages over previously known polyurethanes used as surface coatings. The hindered amine allows surface coatings incorporating the polyurethanes to be easily removed by aqueous compositions having pH between about 2 and 5. Methods of making the prepolymers, polymers, and dispersions are also presented.

14 Claims, No Drawings

POLYURETHANES INCLUDING PENDANT HINDERED AMINES AND COMPOSITIONS INCORPORATING SAME

BACKGROUND OF THE INVENTION

1. Field of the Invention

This invention pertains to polyurethanes and compositions including same useful as surface coatings, the polyurethanes having a plurality of pendant sterically hindered amines and a plurality of pendant moieties which allow the polyurethanes to be emulsified.

2. Related Art

Polyurethane surface coatings are used when surfaces require abrasion resistance and flexibility. In addition, it is preferable that the polyurethane be fast curing, exhibit good adhesion to the substrate to which it is coated, and yield a chemically resistant coating.

The addition polymerization of diisocyanates with macroglycols to produce polyurethanes from liquid monomers is well known. Polyurethanes contain carbamate groups (—NHCOO—), also referred to as urethane groups, in their backbone structure. These are obtained by the reaction of an isocyanate with a macroglycol, also a so-called polyol, or with a combination of a macroglycol and a short-chain extender. In the latter case, segmented block copolymers are produced. Polyols used in these coatings are typically either polyester polyols or polyether polyols. The isocyanates, and isocyanate prepolymers made therefrom, have frequently utilized 2,4-toluene diisocyanate because of the difference in reactivity of the two isocyanate groups. Aliphatic isocyanates, for example methylene bis(cyclohexyl isocyanate) ($H_{12}MDI$), the biuret of hexamethylene diisocyanate, and isophorone diisocyanate (IPDI), offer color stability not provided by aromatic isocyanates.

Moisture-cured polyurethane coatings are isocyanate-terminated prepolymers which, after application, are cured by reaction of the residual isocyanate groups with moisture. The amino groups initially formed react with more isocyanate groups to form urea linkages. Such coatings are typically applied as architectural finishes.

For external applications, aliphatic isocyanates are preferred if the coating is to remain colorless, since coatings based on aromatic isocyanates discolor when exposed to ultraviolet radiation for long time periods. In particular, $H_{12}MDI$ is known to be used in the formulation of soft elastomeric coatings and clear finishes for resilient vinyl flooring and elastomeric automotive coatings. See generally Kirk-Othmer, Encyclopedia of Chemical Technology, 3rd Ed., John Wiley & Sons, vol. 23, pages 576–608.

There are many patents which describe silane-terminated polyurethanes. The majority of these compositions are based on moisture curable formulations for sealants. These include U.S. Pat. Nos. 3,632,557; 3,903,052; 3,979,344; 4,020,043; 4,222,925; and 4,345,053. Most if not all of the polyurethanes described are moisture-curable formulations for sealants.

Water-borne silane-terminated polyurethanes are known, such as those described in U.S. Pat. No. 3,983,291 (Chang). U.S. Pat. No. 4,567,228 (Gaa et al.) describes aqueous dispersible, isocyanate-containing polymers, prepolymers, and chain extended polymers having internal pendant, reactable silane groups. By having internal (i.e. in the polymer backbone) silane groups, Gaa et al. apparently overcome problems exhibited by coating mixtures having polyurethane resins and organosilane coupling agents in mechanical mixture which, upon application to a substrate, react independently with the substrate. One problem mentioned is that the final deposition of the organosilane and polyurethane in the coating on the substrate is somewhat random, leading to some of the organosilane associating with the surface before associating with the polyurethane, apparently leading to poor adhesion of the coating to the surface. Polyurethane resins having internal pendant silylation apparently avoid this problem.

Unfortunately, the above polymers are not readily removed from substrates with aqueous compositions. Such polymers have found utility as "permanent" coatings on concrete, for example. Typically they have not enjoyed utility on vinyl floors in part because the techniques and chemicals used to remove them would also tends to damage a vinyl floor.

Acrylic coatings are known which comprise acrylic polymers having pendant $COO^-$ moieties which are neutralized by tertiary amines. When combined with a $Zn^{2++}$ containing compound, two tertiary amines are displaced by one $Zn^{2++}$ ion to form a plurality of coordination sites which effectively crosslinks the composition. This crosslinking can be reversed by exposing the coating to an aqueous amine, but not by acidic compositions. However, typical hard surface cleaning chemicals are alkaline in order to effectively remove grease substances from the surface. Alkaline cleaning chemicals may actually dull the surface of a zinc-crosslinked polymer because they tend to remove a small amount of coating from the surface. If it is desired to maintain a glossy surface, the cleaned-and-dulled coating would have to be polished to restore the luster.

U.S. Pat. No. 5,073,195 describes silane coupling agents having the general formula $A_{(4-n)}SiY$, wherein A is a monovalent organic radical, Y is a hydrolyzable radical, and n is 1, 2, or 3.

Despite the presence of the above compositions, to the inventor's knowledge, previously known aqueous silane-terminated polyurethanes are not easily removed with any known aqueous composition. Therefore, there continues to be a need in the art of polyurethane coatings for an aqueous silane-terminated polyurethane composition that can be removed easily with aqueous compositions.

SUMMARY OF THE INVENTION

In accordance with the present invention polyurethane prepolymers, chain extended polymers, and compositions including same are described which, after application to a substrate and cured, exhibit excellent "removability" from the substrate by aqueous compositions having a pH ranging from about 2 to about 5, more preferably from 3 to 4. As used herein the term "removability" means that the polyurethane compositions of the invention, when formulated into coatable compositions and then cured, may be removed using mildly acidic, aqueous compositions. The term "prepolymer" means an organic material which is the reaction product of monomers not including chain extending monomers such as water, low molecular weight diols and diamines, and the like, while the term "polymer" means an organic material which is the reaction product of prepolymer and chain-extending monomer. The term "compositions" means dispersions including polymers and/or crosslinked polymers. The term "dispersion" is meant to include emulsions, solutions, suspensions, and colloids.

One aspect of the invention is an isocyanate-terminated polyurethane prepolymer comprising the reaction product of:
(i) a molar excess of organic polyisocyanate sufficient to promote substantially equal access of reactants (ii)–(iv) to isocyanate groups;
(ii) active hydrogen-containing material;
(iii) difunctional sterically hindered amine having the general formula

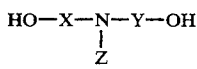

and combinations thereof; and
(iv) internal emulsifier having the general formula

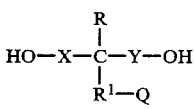

and combinations thereof.

A second aspect of the invention is an aqueous dispersible silane-terminated polyurethane polymer which is the reaction product of the inventive prepolymer with
(B) chain-extending monomer, which is preferably a low molecular weight active hydrogen-containing compound having at least 2 active hydrogens per molecule and which constitutes at least about 20 weight percent of the reaction product;
(C) organic compounds having a pKb of at most about 7; and
(D) silane coupling agent represented by the general formula $ASi(OR^2)_3$ and combinations thereof, the coupling agent present in an amount sufficient to partially crosslink the polyurethanes but insufficient to gel an aqueous dispersion of the reaction product of the prepolymer, B, C, and D.

In the prepolymer and polymer aspects of the invention, the following limitations apply:

Q is a negatively charged moiety selected from $COO^-$ and $SO_4^{2-}$;

X, Y, Z, R, and $R^1$, are independently selected from the group consisting of cyclic and aliphatic organic radicals free of reactive functional groups, and with the provisos that
i. at least 75%, preferably 100% of the Z groups have at least 4 carbon atoms;
ii. R can be hydrogen;
iii. $R^1$ is not required if Q is $COO^-$; and
iv. X, Y, Z, R, and $R^1$ are chosen to afford the isocyanate-terminated prepolymer an equivalent weight not exceeding about 2,000;

A is an organic radical, preferably aliphatic organic radical, having a functional group reactive with isocyanate (—NCO) groups; and $R^2$ is independently selected from $C_1$–$C_4$ inclusive alkyl radicals.

Preferably X, Y, Z, R, and $R^1$, are independently selected from the group consisting of cyclic and aliphatic hydrocarbon moieties having from about 1 to about 20 carbon atoms, and combinations thereof. Further, it is preferred that if one or more of X, Y, Z, R, and $R^1$ is an aromatic moiety, the proportion of said aromatic moieties is less than about 20%, more preferably less than about 10% of the total number of X, Y, Z, R, and $R^1$ moieties.

Preferably, A has as its functional group reactive with —NCO groups a primary amine, secondary amine, or mercapto functional group.

Also, it is preferred that if a portion of the total weight of polyisocyanate, active hydrogen-containing material, and chain-extending monomer is aromatic, that portion does not exceed about 20%, preferably not more than 10% by weight of the prepolymer or polymer.

Those familiar with the art of polyurethanes will appreciate that the term "polyurethane compositions" typically includes prepolymers and polymers having urethane linkages, urea linkages, and random urethaneurea linkages, depending on whether the active hydrogen-containing material is polyhydroxy, polyamino, or combination thereof.

As used herein the terms "gel", "gelled", and "ungelled" refer to the viscosity of an aqueous dispersion of the silane-terminated polymer. An ungelled dispersion preferably has a maximum viscosity of 1000 centipoise, measured at room temperature (about 25° C.) with a Brookfield viscometer, LV spindle set, number 1 spindle, at 60 rpm. A preferred range of viscosity is from about 20 to about 100 cps, measured using the same equipment and conditions.

As used herein the term "molar excess" means that the number of isocyanate equivalents ("NCO EQ") in a given mixture exceeds the number of hydroxyl equivalents ("OH EQ") in the mixture. For the purposes of this invention, the ratio (NCO EQ)/(OH EQ) is preferably greater than 1.01, when preparing prepolymer and polymers. In some instances, such as in the context of the quasi-continuous process of the invention, it may be desirous to use the term "excess NCO EQ" in the recycle stream (see Example 2). The phrase "a molar excess of organic polyisocyante sufficient to promote substantially equal access of reactants (ii)–(iv) to isocyanate groups" means that prepolymers and polymers of the invention comprise a random distribution of urethane (or urea) linkages, Z groups, and Q groups along individual prepolymer and polymer chains.

The term "active hydrogen-containing material" means an organic material having isocyanate-reactive functional groups, and includes polyhydroxy and polyamino materials. Preferred polyhydoxy materials are polyols such as polyether polyols, polyester polyols, and the like, or combinations thereof. Preferred polyamino materials include polyamines and aminoalcohols.

As used herein "internal emulsifier monomer" means a monomer having a moiety (defined as "Q" above) which allows the prepolymers and polymers of the invention to be emulsified simply by the addition of water or other aqueous media.

The critical monomer in the inventive polyurethane prepolymers, polymers, and compositions of the invention which allows surface coatings incorporating them to be removed by aqueous materials having pH (negative base ten logarithm of the hydrogen ion concentration) ranging from about 2 to about 5 is the difunctional sterically hindered amine monomer. "Difunctional" means that the monomer is capable of reacting with the other monomers to be incorporated into the prepolymer and polymer backbone. It has been determined that at least 75% of the Z moieties, preferably 100%, should have at least 4 carbon atoms to provide sufficient steric hindrance to minimize the possible formation of internal salts with the Q moieties of the internal emulsifier monomer, which is undesirable from the standpoint of aqueous removability and water spot-resistance of coatings employing the prepolymers and polymers of the invention.

The inventive polyurethane polymers and compositions including same comprise the reaction product of prepolymers of the invention with low molecular weight (less than about 500) active hydrogen-containing chain-extending monomers which are preferably non-aromatic, such as low molecular weight organic diamines (such as ethylenediamine, bis(aminopropyl)-methylamine, and the like) and diols (such as cyclohexane dimethanol, 1,4-butanediol, 1,6-hexanediol, and the like). An especially preferred chain-extending monomer is ethylenediamine, which improves the abrasion resistance of surface coatings incorporating the inventive polyurethane compositions. As previously stated, the various monomers of the inventive polyurethanes described above may contain low percentages of aromatic moieties, depending on the degree of color stability desired by the user for coatings incorporating same. Higher percentages of aromatic moieties in the polyurethane prepolymer will decrease the color stability of coatings. If it is desired to decrease the susceptibility to color change, the weight percentage of aromatic moieties in the prepolymers and polymers of the invention is preferably less than about 20%, more preferably less than about 10%, and particularly preferably less than 1%.

Another aspect of the invention is an aqueous dispersion of the aqueous dispersible, ungelled, polyurethanes of the invention, having viscosity as above-described.

A further aspect of the invention lies in flowable coating precursor formulations comprising the inventive aqueous dispersions and a plasticizer. The inventive coating precursor formulations may optionally include leveling agents, antifoam agents, surfactants, and the like, as known in the art. The coating precursor formulations are preferably formulated with the inventive aqueous dispersion, plasticizer and other additives so that the resulting coatings (also an aspect of the invention) have a glass transition temperature ($T_g$) no less than about 30° C.

A further aspect of the invention is a batch method of making the inventive water dispersible ungelled polyurethane polymers. The inventive batch method includes the steps of:
(a) forming a prepolymer composition, the prepolymer composition comprising a non-aqueous solvent and an isocyanate-terminated polyurethane prepolymer, the prepolymer formed by reacting ingredients (i–iv) listed above in a non-aqueous solvent having a molar excess of polyisocyanate at a temperature less than about 90° C., preferably less than about 80° C.,
(b) combining the prepolymer composition formed in step (a) with an organic compound having a pKb of at most about 7 to form a neutralized prepolymer composition comprising the solvent and a neutralized polyurethane prepolymer; and
(c) combining the neutralized prepolymer composition with an amount of silane coupling agent sufficient to partially crosslink the neutralized polyurethane prepolymer but insufficient to gel the composition.

One preferred batch method includes the further step (d) of adding sufficient water to form a dispersion of the partially crosslinked polyurethane composition, which is a coating precursor composition. Methods wherein plasticizers and other ingredients are added to produce a coating precursor composition are also preferred.

An alternative method of making an ungelled, aqueous dispersion of partially crosslinked silane-terminated polyurethanes comprises the use of a homogenizer in a quasi-continuous process. The quasi-continuous process comprises the steps of first forming a prepolymer composition comprising non-aqueous solvent and an isocyanate-terminated polyurethane prepolymer by combining in a first continuously stirred vessel having an inert atmosphere ingredients (i–iv) as listed above and a non-aqueous solvent to form an isocyanate-terminated polyurethane prepolymer of the invention. A chain extender composition is formed in a second vessel by combining water, chain-extending monomer, organic compound having a pKb of at most about 7, and an amount of silane coupling agent sufficient to partially crosslink the polyurethane polymers but insufficient to gel the resulting composition. A continuous flow of the non-aqueous prepolymer contained in the first vessel is combined with a continuous flow of the chain extender composition from the second vessel in a third vessel with agitation, the agitation being sufficient to form a dispersion of partially crosslinked polyurethane polymers. The dispersion is recycled from the third vessel to the continuously stirred second vessel while maintaining flow from the first and second vessels to the third vessel. This is continued until the contents of the first vessel are exhausted and all of the original contents of the first and second vessels are in the second vessel (thus the term "quasi-continuous").

Further aspects and advantages of the invention will be recognized by reading the description of preferred embodiments which follows.

DESCRIPTION OF PREFERRED EMBODIMENTS

Aqueous Dispersible Silane-Terminated Polyurethanes

The following structure (I) represents the general structure of the aqueous dispersible silane-terminated polyurethanes of the invention:

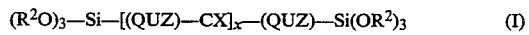

(I)

wherein "QUZ" represents a polyurethane prepolymer having a plurality of pendant Q and Z moieties as above described, "CX" denotes chain-extending monomer, and x may be any value that does not exceed the viscosity limitations mentioned previously, but preferably ranges from about 1 to about 1000, more preferably from about 10 to about 100.

The polyurethane backbone of structure (I) has four constituents: the monomer supplying pendant sterically hindered amines denoted by Z; a monomer which contributes an emulsifying moiety Q; the connecting urethane residues U; and chain-extending monomer CX. As used herein "urethane residue" denotes either a urethane linkage,

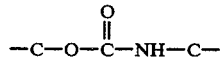

or a urea linkage:

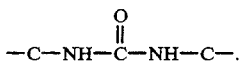

It should be pointed out that aqueous dispersible, ungelled polyurethanes of the invention may contain all urethane linkages, all urea linkages, or a random or block copolymer arrangement of urethane and urea linkages, as is known in the art.

Sterically Hindered Amines

Sterically hindered amines useful in the invention are preferably those having the general formula

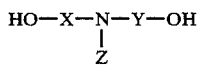

and combinations thereof wherein Z is either cyclic or aliphatic organic radical free of reactive functional groups having at least 4, preferably from about 4 to about 20 carbon atoms. As mentioned previously, if the user desires that the coating exhibit little color change, preferably at most 10%, more preferably at most 5%, and most preferably only about 1% of the Z moieties are aromatic.

Preferably Z is a $C_4$-$C_{12}$ (inclusive) straight or branched chain alkyl or cycloalkyl. If a substantial number of the Z radicals contains less than 4 carbon atoms, there is a possibility that too many internal salts of the amine and the emulsifying moieties may form, a result which is undesirable as this increases the water sensitivity (spotting) of the subsequent coating. It is theorized that at least 75% of the Z radicals in a given prepolymer should have 4 or more carbon atoms to avoid formation of the salts. Also, the dispersions of the invention become self-emulsifying if too many internal salts are formed, which may decrease the control of the formulator in controlling the degree of homogenization by the reactant having pKb of at most 7, such as triethylamine, or by agitation in the quasi-continuous method.

The molar percentage of the sterically hindered amine as a percentage of the total moles of reactants (i)–(iv) is a critical aspect of the invention as it pertains to the removability of coatings. Preferably the molar percentage is no less than about 2 but no more than about 20. Below a molar percentage of about 2, coatings made using the dispersions of the invention will be difficult to remove by aqueous removing agents having pH ranging from about 2 to about 5. Above about 20 mole percent, dispersions of the invention may have poor rheological properties, and coatings made therefrom may exhibit intolerable sensitivity to water and mildly acidic materials. It may be possible to coat dispersions of the invention having greater than 20 mole percent hindered amine using elevated temperatures and/or by adding plasticizers, but increasing the heating temperature adds a heating step, which is feasible but not as preferred.

Internal Emulsifier

The monomer having attached thereto an emulsifying moiety is selected from the group of compounds having the general formula

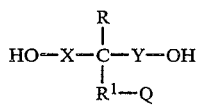

and combinations thereof. The terminal hydroxyl groups allow this monomer to react with isocyanate groups and be incorporated into the polyurethane backbone.

As noted previously, X, Y, R, and $R^1$ are independently selected from the group consisting of cyclic and aliphatic organic radicals free of reactive functional groups, preferably having from 1 to about 20 carbon atoms, and combinations thereof, with the provisos that:
  i. R can be hydrogen; and
  ii. $R^1$ is not required if Q is COO—.

It will be appreciated by those skilled in the art that the total number of carbon atoms of X, Y, R, and $R^1$ must not exceed values which would increase the viscosity of dispersions of the invention to values above those enumerated previously so that the dispersions are not coatable or capable of being rendered coatable by addition of a plasticizer or other property modifier, and/or increase in temperature.

The internal emulsifier will preferably range from about 5 to about 15 mole percent of the total moles of reactants (i)–(iv). Below about 5 mole percent, chain extended polyurethanes produced may be difficult to disperse, and dispersions produced may be unstable (i.e. subject to demulsification at temperatures above room temperature, or 20° C.). On the other hand, employing more than about 15 mole percent may produce a water-sensitive coating.

Active Hydrogen-Containing Materials

A. Polyols

The preferred polyols used to make in the inventive polyurethane prepolymers and polymers are polyester polyols and polyether polyols. Polyether polyols are addition products derived from cyclic ethers such as ethylene oxide, propylene oxide, tetrahydrofuran, and the like.

Polyester polyols are more preferred for use in the present invention than polyether polyols. The polyester polyols of choice are macroglycols (glycols having greater than about 5 repeat units) with a low acid number and low water content, and typically have a molecular weight (number average) of about 2000.

Polyester polyols for use in the present invention are particularly preferably made by the reaction of caprolactone with a suitable glycol such as ethylene glycol, propylene glycol, diethylene glycol, dipropylene glycol, 1,4-butanediol, and 1,6-hexanediol. The reaction of caprolactone with a suitable diol yields a polycaprolactone,

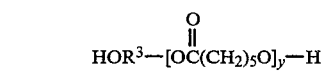

where y is limited to values which will not exceed the viscosity limitations mentioned herein for dispersions of the invention. Preferably y ranges from about 10 to 100. A particularly preferred polyester polyol for use in the present invention is the polycaprolactone diol available under the trade designation "Tone 230" from Union Carbide Corporation, which has an equivalent weight of 623. Polycaprolactone diols having equivalent weight less than about 300 are not preferred for the present application since they are too water sensitive, leading to water spotting of coatings made therewith.

Molar percentages of polyol in the prepolymers are preferably no more than about 20 percent, more preferably ranging from about 4 to about 12 percent of the total moles of reactants. Exceeding the upper limit may produce polyurethane coatings which have less resistance to abrasion, scuffing, and the like, for most coating applications, while using less than 4 mole percent in conjunction with a polyisocyanate mole percentage exceeding about 60 produces polyurethane polymers which may be difficult to disperse and may result in coatings which are undesirable for floor finish applications.

B. Polyamines

As previously mentioned, the active hydrogen-containing compounds may be polyamines, particularly nonaromatic diamines. Preferred nonaromatic diamines for use in the present invention include ethylenediamine, propylenediamine, hexamethylenediamine, isophoronediamine, cyclohexanediamine, and bis-(aminopropyl)methylamine.

Aromatic polyamines may be partially or totally substituted for nonaromatic polyamines as desired. Aromatic polyamines are not preferred for coatings which the user would like to remain at its initial color since ultraviolet radiation will affect the color of the coating. If it is desired to reduce the effect of ultraviolet radiation on the color of coatings made using the polyurethanes of the invention, aromatic polyamines should be avoided.

Polyisocyanates

The term "polyisocyanate" includes diisocyanates and compositions including monoisocyanates and diisocyanates, and compositions including mono-, di-, and polyisocyanates. Thus, although diisocyanates are preferred, it is within the scope of the invention to use polyisocyanates in combination with diisocyanates, and even with small amounts of monoisocyanate, as disclosed in U.S. Pat. No. 4,567,228, incorporated herein by reference. The average functionality of the isocyanate reactants is important in controlling the tendency of the polymer to gel. When polyisocyanates are used, some monofunctional isocyanate should be present to reduce the average isocyanate functionality. In some instances it is desirous to use so-called "blocked" isocyanates, in which all isocyanates groups are blocked with a suitable blocking agent containing an active hydrogen. Commercial blocking agents include caprolactam, phenol, and acetone oxime. As the "free" or released blocking agent is typically generated in a thermal unblocking process, and since the free blocking agents can function as plasticizers, blocked isocyanates may be preferred in certain coating formulations.

Since polyurethanes derived from aromatic polyisocyanates undergo slow oxidation in the presence of air and ultraviolet radiation, causing a discolorization which is unacceptable in some applications (see Kirk-Othmer, Encyclopedia of Chemical Technology, 3rd Ed., vol. 23, page 582), polyurethanes of the invention used in coating applications are typically and preferably derived from aliphatic and/or non-aromatic cyclic isocyanates, which produce color stable polyurethanes, such as might be desired in floor finishes exposed periodically to sunlight.

Suitable non-aromatic cyclic diisocyanates for use in the present invention included hexamethylene diisocyanate (HDI), methylenebis-(4-cyclohexylisocyanate) ($H_{12}MDI$) and isophorone diisocyanate (IPDI). Also useful are isophorone-based isomeric trimethyl hexamethylene diisocyanates (TMDI), trimerized IPDI, and 1,3-bis(isocyanatomethyl) cyclohexane ($H_6XDI$). A particularly preferred diisocyanate is H12MDI, known under the trade designation "Desmodur W", available from Miles, Inc. (formerly Mobay Chemical Company). Aromatic polyisocyanates not having a bridging methylene unit may be used where the user is not concerned with discolorization, but those having bridging methylene units between aromatic rings are not preferred for coatings exposed to sunlight or other ultraviolet radiation source where the user is concerned with preventing discolorization.

Organic compounds having a pKb of at Most 7.0

These compounds are preferably low molecular weight tertiary amines which have the capability of neutralizing the prepolymer acidic Q moieties by ionically bonding therewith. As used herein the term "pKb" denotes the negative base ten logarithm of the aqueous dissociation constant at 20° C. for the particular compound used. As an alternative definition, organic compounds having an aqueous pH of about 8.0 or greater, preferably about 9.0, may be used successsfully in the invention.

Examples of suitable tertiary amines for use in the present invention include triethylamine, tripropylamine, and tributylamine, and all possible isomers thereof.

Catalysts

In theory, the uncatalyzed reaction of isocyanates with macroglycols (polyols) may be utilized in formation of polyurethane prepolymers of the invention, if sufficient time is available. If time is of the essence it is generally-known that the nucleophilic reactions of isocyanates with polyols may be catalyzed by acids and organic bases. Typical organic bases included triethylamine, pyridine, and the like, while strong acids and Lewis acids are also suitable catalysts. The preferred catalysts are organometallic compounds, such as tin derivatives.

Tailoring performance to improve processing properties of polyurethanes requires the selection of efficient catalysts. Generally, an increase in base strength in tertiary amines increases the catalytic strength, wherein the catalytic activity of tertiary amines is the result of the free electron pair on the nitrogen. The availability of the free electron pair for complexation is more important than its relative base strength. Typical amine catalysts useful in the present invention include triethylamine, and those known under the trade names "Dabco" (Air Products and Chemicals), "Niax" (Union Carbide Corporation), "Polycat" (Abbott), and "Thancat" (Jefferson Chemical Company).

Organometallic compounds useful in catalyzing the reaction of isocyanates with macroglycols include, di-n-butyltin dilaurate, as well carboxylic acid salts of calcium, cobalt, lead, manganese, zinc, and zirconium employed as cocatalysts with tertiary amines, tin compounds and tin-amine combinations.

Silane Coupling Agents

Silane coupling agents useful in the present invention are represented by the general formula (II)

$$ASi(OR^2)_3 \qquad \text{(II)}$$

wherein A is an organic radical preferably having a functional group which is reactive with isocyanate groups. Typical and preferred isocyanate reactive groups include primary amines, secondary amines, and mercapto groups. $R^2$ is a $C_1$–$C_4$ (inclusive) alkyl radical. Preferred silane coupling agents within general structural formula (II) include those wherein A is 3-aminopropyl, 3-hydroxypropyl, 3-thiopropyl, 3-mercaptopropyl, 2-aminoethyl, 3-aminophenyl, 3-aminocyclohexyl, and the like. Particularly preferred is 3-aminopropyltrimethoxysilane due to its commercial availability.

Plasticizers

The term "plasticizer" as used herein means a nonvolatile material which remains in the polyurethane coating composition in its ultimate use. Since the polyurethanes and plasticizer materials useful in the present invention are not chemically bound to one another, the term "external plasticizer" is commonly used. As noted above, in some cases the blocking agent used in blocked isocyanates, which are generally thermally removed from the isocyanate molecule proper to render an isocyanate functionality (and thus may be termed an "internal plasticizer"), may be advantageously used as a plasticizer, either alone or in combination with an external plasticizer. To the extent cost is a concern, the use of blocked isocyanates, such as those blocked with caprolactam, may offer cost advantages over the use of an external plasticizer.

Whether internal or external (or combination thereof), the effect of plasticizers on the dispersions of the invention is to lower the glass transition temperature ($T_g$) of the cured coating resulting from the dispersion/plasticizer combination. Preferably, the type and amount of plasticizer are selected to afford a coating having a glass transition temperature of no less than about 30° C.

The plasticizer may be one or a combination of two or more materials which together provide the function of reducing $T_g$. Typical and preferable plasticizers for use in the present invention are mono- and dialkyl phthalates, sebacates, and phosphates, such as dinonyl phthalate, dioctyl phthalate, tributoxyethyl phosphate, dioctyl sebacate, and the like.

The amount of plasticizer employed in the compositions of the invention depends primarily of course on the reduction in $T_g$ desired, and, to a lesser extent, on the chemical nature of the polyurethane. Successful ranges of plasticizer include from about 1 to about 6 weight %, more preferably from about 2 to about 5 weight based on the total weight of the precursor composition.

Methods of Making the Prepolymers, Polymers, and Dispersions of the Invention

Batch and quasi-continuous processes are within the scope of the inventive methods of making the polyurethane prepolymers, polymers, and dispersions. The batch method comprises mixing ingredients (i)–(iv) and chain extending monomer denoted above all in the same vessel to make an isocyanate-terminated polymer, after which is added neutralizing amine and silane coupling agent. Water is added substantially immediately after the addition of the silane coupling agent to form a dispersion (emulsion). A more succinctly described example is given in Example 1.

In both the batch and quasi-continuous methods of the invention it is of paramount importance that i) the polyisocyanate be present in sufficient molar excess of isocyanate groups over ingredients (ii)–(iv) and chain-extending monomer, and ii) that the reaction temperature be controlled to less than about 90° C., preferably less than 80° C., to avoid gelation of the dispersion. The temperature of course should be high enough to prevent significantly lengthening of the time required for the reaction to be completed. Catalysts may be added as necessary to increase the rate of reaction.

The quasi-continuous mode of operation of the invention requires two separate vessels (or two separate chambers within a single vessel). In a first vessel is charged ingredients (i)–(iv) and a non-aqueous solvent (preferably an N-alkyl-pyrrolidone such as N-methyl-pyrrolidone and the like) to form an isocyanate-terminated prepolymer. Into a second vessel is charged water, chain-extending monomer, organic compound having a pKb of at most about 7, and an amount of silane coupling agent sufficient to partially crosslink the polyurethanes but insufficient to gel the dispersion. A continuous flow of the non-aqueous prepolymer contained in the first vessel is combined with a continuous flow of the aqueous mixture from the second vessel in a third vessel in the presence of high-shear agitation means, whereby the dispersion is formed. One high-shear agitation means found useful for laboratory scale reactions is that known under the trade designation "Homomixer" from Gifford. The dispersion is recycled to the continuously stirred second vessel. This is continued until the contents of the first vessel are exhausted and all of the contents of the first and second vessels are in the second vessel.

One advantage of the quasi-continuous process is that it is much easier to scale up to commercial volumes as compared with the batch process of the invention and other batch processes. The process is termed "quasi-continuous" since the reaction is continued to the point where the contents of the first vessel are consumed; however, a plurality of first vessels may be serially connected to extend the length of time of continuous processing, provided a large enough second vessel or a plurality of second vessels is provided which will hold the contents of the first vessel(s) and the original charge to the second vessel(s). A detailed example of the quasi-continuous method is given as Example 2.

Removability of Coatings of the Invention

One advantage of coatings made using the aqueous dispersible, ungelled polyurethanes of the invention is the glossy surface produced. Gloss is affected by the amount of silane coupling agent used, as previously described.

Another advantage of coatings made using the aqueous dispersible, ungelled polyurethanes of the invention is the removability of the coating by aqueous compositions having pH ranging from about 2 to about 5. Coatings made in accordance with the teachings of the invention can be formulated to be resistant to water spotting since water-sensitivity is largely dependent upon the polyol composition, which may be controlled by the formulator.

In order to test the removability of the coatings of the invention, polyurethane-coated vinyl surfaces were subjected to a removability test (the Gardner removability test is described below under "Test Methods"). Briefly, an acidic stripper solution was used in conjunction with a nonwoven pad as an abrasive medium on a standard abrasion tester (trade designation "Gardner Abrasion Tester", available from Pacific Scientific). Removability was measured by the number of cycles required to completely remove the coating. The change in gloss of the coatings before and after the removability test was also measured. The amount of coating removed per 50, 100, and 150 or more cycles of the abrasion test was measured. Greater than 150 cycles for removal of a portion of a coating means that the coating was not sufficiently removable within the scope of this invention.

Where the silane-terminated polyurethane polymers of the invention are to be incorporated into floor finishes, the cured finish may be buffed using nonwoven floor pads by attaching the pads with a suitable adhesive compound or hook and loop type fasteners to a floor pad holder in a fashion so as to cover the surface of the floor pad holder.

A floor pad holder bearing a nonwoven floor pad is typically attached to a rotary electric floor machine, and the polyurethane dispersion-coated floor buffed at about 2000 rpm as would normally be done by those skilled art.

Removal of Coatings of the Invention

As used-herein the term "coating" means a dispersion of the invention minus substantially all water. As previously noted, it was a primary goal of the invention to provide water dispersible polyurethane-based surface coatings which are easily removed by aqueous compositions having pH ranging from about 2 to about 5. In theory, this means that the coatings of the present invention may be removed by any acidic composition; however, as another goal of the invention was to present a polyurethane coating which can be removed from a substrate without harming the underlying substrate, the acidic composition used is also dependent upon the composition of the substrate.

For example, if the polyurethanes of the present invention are formulated into a coating precursor and applied to a vinyl surface, which is in turn adhered to an underlying structure by an adhesive, the composition of the acidic stripper is preferably such as to not harm the vinyl, the adhesive, or the structure. The removability tests in the Examples which follow remove (or attempt to remove) polyurethane coatings from vinyl test tiles using aqueous glycol ether-based acidic strippers. The aqueous acidic stripper composition actually used would be formulated to avoid these problems. The threshold inquiry in the Examples was to determine if the coatings of the invention would or would not be removed by the aqueous acidic stripper composition used.

Assignee's copending application Ser. No. 08/016,425, filed Feb. 11, 1993 pending describes acidic compositions useful in removing the polyurethane coatings of the present invention from hard surfaces. These compositions contain as their essential ingredients an organic acid (solid or liquid), at least one organic solvent, and water. Optional ingredients are those readily known in the art, such as perfumes, dyes, couplers, hydrotropes, surfactants, and the like.

When the substrate to which the coating is applied is a typical composition vinyl tile, one particularly preferred ready-to-use stripping composition is that containing 7 weight percent ethylene glycol n-butyl ether (2-butoxyethanol), 5 weight percent diethylene glycol n-butyl ether, 1.7 weight percent hydroxyacetic acid, and balance water, which is described in assignee's copending application Ser. No. 08/016,425, filed Feb. 11,1993 pending incorporated by reference herein. The diethylene glycol n-butyl ether is present in an amount just necessary to avoid having to couple into solution the ethylene glycol n-butyl ether.

The polyurethane prepolymers, polymers, dispersions, coatings, and methods of the invention will now be further described with reference to the following Test Methods and Examples, wherein all percentages and parts are by weight unless otherwise specified.

Test Methods

Test Method I: Gloss Measurement

For the purposes of the following test procedure, "gloss value" means a glossmeter reading using a 20° or 60° glossmeter geometry, in accordance with ASTM D-523. The 20° and 60° glossmeter geometry gloss measurements, five per sample, were made after buffing, and the average of these recorded. Test method ASTM D-523 was followed for determining specular gloss values. Note that "60° glossmeter geometry gloss" value (i.e., incident light reflected from the test surface at incident angle measured 60° from vertical) relates to the "shininess" of the surface and correlates to the appearance of the floor about 3 meters in front of the observer. A "20° glossmeter geometry gloss" value relates to the depth of the reflection and correlates to the appearance of the floor about 60 cm in front of the observer. A reading off a glossmeter is an indexed value, with a value of "100" given to the glossmeter reading (from any angle) from a highly polished, plane, black glass with a refractive index of 1.567 for the sodium D line. The incident beam is supplied by the tester itself. A value of 0 is no or very low gloss, while "high gloss" at 60° geometry is about 75 or greater (or 30 or greater at 20° geometry). A glossmeter known under the trade designation "Micro-TRI", from BYK Gardner, was used.

Test Method II: Coating Removability

In a variation of ASTM 1792-82, polyurethane-coated vinyl tiles were mounted onto the fixed bed of a durability tester known under the trade designation "Gardner Abrasion Tester" (Pacific Scientific, Calif.). This machine essentially comprised a horizontal surface to which the test tiles were attached, and a reciprocating holder for a nonwoven surface treating article. A 8.9 cm ×3.8 cm square white nonwoven pad (trade designation "Scotch-Brite Super Polish", #9030, from 3M) was attached to the reciprocating holder (narrow boat with fitted weight) so that the pad rubbed across the surface of the coated test tile. The weight of the holder and fitted weight was approximately 500 g.

In preparation for each test, one black composition vinyl tile for each two coating samples to be tested were scribed into halves with a wax pencil. For each coating to be tested, one half of the tile was coated with four coatings (2.2 milliliters per coat), with 30–45 minutes drying time between coatings. After allowing the coated tiles to dry overnight, the coated tiles were aged in an oven at 49° C. for three days. After three days aging, the tiles were removed from the oven and let cool at least one hour at room temperature before proceeding with the removability test.

In each test, the weight was removed from the sample holder, and the sample holder subsequently attached to the cables of the abrasion tester. A #9030 pad (as above described) was placed into a Petri dish and enough acidic stripper solution poured over the pad into the Petri dish to cover the pad. The pad was then allowed to soak for at least one minute. The tile having the polyurethane coating to be tested was then placed in position on the abrasion machine. Using a forceps, the pad was then removed from the stripper solution, letting the excess stripper composition drain from the pad into the dish. The pad was then placed onto the sample holder, and secured therein by fasteners known under the trade designation "Instalok", from 3M. The sample holder/pad assembly was then inverted so that the pad touched the sample surface, after which the weight was placed back onto the sample holder. The abrasion machine was then run for one or two cycles so that the stripper-soaked pad wetted the coated tile. The wetted tiles were allowed to soak for 1 minute. The abrasion tester was then allowed to run for an additional 49 cycles or until 50 cycles had been completed.

Samples were then removed from the machine, rinsed well with water, and allowed to dry. The test area of the tile was then inspected to determine if the polyurethane finish had been removed. If so, the test was complete. If the finish remained on the tile, the tile was placed back in the machine and 50 more cycles run as described above until the finish was removed or 150 cycles had been complete, whichever occurred first.

The following materials were used in the Examples which follow.

Materials Description

DES W means "DESMODUR W", a trade designation for methylenebis-(4-cyclohexylisocyanate), otherwise known as (H12MDI) or dicyclohexylmethane-4,4'-diisocyanate, available from Miles Inc. (formerly Mobay Chemical Company), Pittsburgh, Penna.

"TONE 230" is a trade designation for a polycaprolactone diol (equivalent weight =623 grams), commercially available from Union Carbide Corporation, Danbury, Conn.

NBDEA is n-butyldiethanolamine, available from BASF Corporation, Parsippany, N.J.

DMPA is dimethylolpropionic acid, available from Alcolac Inc., Linthicum, Md.

CHDM is cyclohexanedimethanol.

ED is ethylenediamine, available from BASF Corporation, Parsippany, N.J.

"A-1110" is a trade designation for aminopropyltrimethoxysilane, available from Union Carbide Corporation, Danbury, Conn..

NMP is N-methylpyrrolidone, available under the trade designation "M-PYROL", from GAF Chemicals, Texas City, Tex.

"T-12" is a trade designation for dibutyltin dilaurate, available from Akzo Chemical Company, Chicago, Ill.

TEA is triethylamine, available from BASF Corporation, Parsippany, N.J.

BCAR means butyl "Carbitol", the trade designation for diethylene glycol mono n-butyl ether, and BCEL means butyl "Cellosolve", the trade designation for ethylene glycol mono n-butyl ether (2-butoxyethanol), both available from Union Carbide Corporation, Danbury, Conn.

Examples

In the following examples, "EQ" means equivalents, "EQ WT" means equivalent weight (weight in grams of one mole divided by number of reactive functional groups), "NCO" denotes the isocyanate functionality, and "OH" denotes the hydroxyl functionality. NCO equivalents were determined using the standard titration method of American Society of Testing Materials (ASTM) 309-82, which is incorporated herein by reference.

Product and Method Examples

Example 1: Two-step Batch Method of Preparation of a Dispersion of a Silane-Terminated Polyurethane Including a Hindered Amine The ingredients listed in Table 1 were charged to a 3 liter resin kettle in the following manner: first was charged DES W, after which the kettle vapor space evacuated and then flushed with nitrogen. NMP was then added with moderate agitation and the mixture heated to 60° C. After the temperature rose to 60° C., TONE 230, CHDM, NBDEA, and DMPA were added, and the temperature held at 80° C. for 2 hours.

TABLE 1

|  | WT. (g) | EQ WT | EQ |
|---|---|---|---|
| TONE 230 | 187.5 | 623.3 | 0.3 |
| CHDM | 21.5 | 71.7 | 0.3 |
| NBDEA | 24 | 80 | 0.3 |
| DMPA | 27 | 67.5 | 0.4 |
| DES W | 183.5 | 131 | 1.4 |
| NMP | 110 | — | — |

From Table 1 it can be seen that NCO EQ/OH EQ=1.077.

Afterwards and with continued stirring, 20 grams of TEA was added and the reaction continued for another 30 minutes with sufficient cooling to keep the reaction below about 80° C., after which 13.4 grams (0,074 EQ) of A-1110 was slowly added, again being careful to avoid temperature increases beyond 80° C. Immediately following the addition of the silane was the addition of 1600 grams deionized, room temperature water with stirring, which emulsified the composition. The emulsion of partially crosslinked, ungelled, silane-terminated polyurethanes was stable at room temperature, and the polymers had sterically hindered amine monomer randomly distributed in their backbones.

Example 2: Quasi-continuous Method of Preparation of a Dispersion of a Silane-Terminated Polyurethane Including a Hindered Amine Into a first 3 liter resin kettle was charged, in the order substantially as described in Example 1, the ingredients listed in Table 2 with reaction proceeding for 2 hours at 80° C. with agitation and under a nitrogen blanket.

TABLE 2

|  | WT (g) | EQ WT | EQ |
|---|---|---|---|
| TONE 230 | 487.5 | 623.3 | 0.78 |
| DES W | 582.4 | 131 | 4.45 |
| NBDEA | 83.2 | 80.5 | 1.03 |
| DMPA | 52 | 67.1 | 0.78 |
| TEA | 39 | — | — |
| T-12 | 0.1 | — | — |
| NMP | 300 | — | — |

Thus the NCO EQ/OH EQ=1.72, and the EQ WT of the prepolymer formed was determined to be 832.4. As the prepolymer weighed 1544 grams, the prepolymer EQ=1.86.

Meanwhile, in a second 3 liter resin kettle was mixed 3585 grams deionized, room temperature water, 40 grams (0,223 EQ) A-1110, and 46 grams (1.53 EQ) ED with mild agitation at 35° C.

After the reaction in the first resin kettle had proceeded for two hours, the contents of the two kettles were simultaneously fed by positive nitrogen pressure to a high-shear homogenizer known under the trade designation "Homomixer" (Gifford), forming an emulsified product stream which was recycled back to resin kettle two via a pump. The flow rates from each of the first and second resin kettles were about 2.04 kilograms/min. The excess NCO EQ of the recycle stream was 1.86−(1.53+0.223)=0.10. This procedure was continued until the contents of the first resin kettle had been consumed completely, thereby forming a partially crosslinked, ungelled, emulsified version of a polydisperse mixture of silane-terminated polyurethanes having sterically hindered amine randomly distributed along their backbones.

Example 3: Non-Silane--Terminated Polyurethanes Containing Pendant Hindered Amines Although in most surface coatings it is preferable to utilize an emulsion of cross-linked silane-terminated polyurethanes, it is possible to utilize non-silane-terminated versions for coating applications such as wall coatings which are not subject to repeated abrasion.

Example 2 was repeated with the only change being that A-1110 silane coupling agent was not employed in the second resin kettle and 52.7 g (1.75 EQ) of ethylenediamine (rather than 46 g (1.53 EQ)) was used. The excess NCO EQ in the recycle stream was thus 1.86−(1.75)=0.11. When the contents of the second resin kettle had been exhausted, the process was stopped, yielding a polydisperse emulsion of polyurethanes having sterically hindered amines randomly distributed along their backbones.

Example 4 and Comparative Examples A, B, and C

To emphasize that the sterically hindered amine monomer must have Z having 4 or greater carbon atoms to produce coatings of sufficient removability, Example 1 was repeated four times, the only differences being the substitution of the following amines for NBDEA:

| Example 4 | phenyldiethanolamine |
| Comp. Ex. A | methyldiethanolamine |
| Comp. Ex. B | ethyldiethanolamine |
| Comp. Ex. C | propyldiethnaolamine |

Comparative Examples D and E

The polyurethane dispersion of Comparative Example D was the same as that prepared in Example 1A of U.S. Pat. No. 3,983,291, the only changes being that TONE 230 was substituted for TONE 0200, and no hardening polyol (known under the trade designation "Carbowax 1450", Union Carbide Corporation), and no 1,4-butanediol were used.

The polyurethane dispersion of Comparative Example E was the same as that prepared in Example 1 of U.S. Pat. No. 4,567,228, the only changes being that TONE 230 was substituted for the polyoxypropylene diol and polyoxypropylene triol used, and NMP was substituted for MEK as solvent.

Performance Testing (Removability and Gloss)

Polyurethane compositions of the present invention made in accordance with Examples 1–4 and Comparative Examples A, B, and C were compared with polyurethanes made in accordance with U.S. Pat. Nos. 3,983,291 (Comparative Example D) and U.S. Pat. No. 4,567,228 (Comparative Example E) in terms of gloss and removability.

Table 3 details the gloss and removability results using the tests described in Test Methods. The acidic stripper used consisted of 5 grams BCAR, 7 grams BCEL, 1.7 gram hydroxyacetic acid, and 86.3 grams deionized water, and had a pH of 3.2.

TABLE 3

| Example | I (60° Gloss) initial | I (60° Gloss) final | II (Removability)[1] cycles |
|---|---|---|---|
| 1 | 60 | 7 | 50 |
| 4 | 66 | 8 | 50 |
| A | 58 | 5 | <50 |
| B | 59 | 5 | <50 |
| C | 61 | 5 | <50 |
| D[2] | 56 | 48 | >>150 |
| E[3] | 59 | 51 | >>150 |

1. Measured in accordance with ASTM 1792-82, except for Example 4 and Comparative Examples A, B, and C. Example 4 coating was not easily wiped off by hand with a rag but was easily removed by the acidic stripper with simple hand wiping with a stripper-soaked rag. Comparative Example coatings A, B, and C were easily wiped off of the vinyl test tiles with a deionized water-soaked rag. "<" means "less than", ">>" means "much greater than."
2. Modified version of Example 1 of U.S. Pat. No. 3,983,291.
3. Modified version of Example 1A of U.S. Pat. No. 4,567,228.

Analysis of Test Results

It should initially be pointed out that non-coated, "worn" composition vinyl tiles have a 60° gloss of about 5. From the above Examples it is apparent that the polyurethanes of the present invention are removable by mild acidic aqueous compositions. Polyurethanes not including a sterically hindered amine having 4 or more carbon atoms (Comparative Examples A, B, and C) were easily removed by water and are thus clearly not suitable for use as surface coatings where exposure to water is expected, such as floors, exterior walls, home decks, and the like. On the other hand, the polyurethanes of U.S. Pat. Nos. 3,983,291 (Comparative Example D) and 4,567,228 (Comparative Example E) were not removed at all by the acidic stripper and test method employed.

While this invention has been described in connection with specific embodiments, it should be understood that it is capable of further modification. The claims herein are intended to cover those variations which one skilled in the art would recognize as the chemical equivalent of what has been described here.

What is claimed is:

1. Aqueous dispersible silane-terminated polyurethane polymer which is the reaction product of:
  (A) an isocyanate-terminated polyurethane prepolymer which is the reaction product of:
    (i) a molar excess of organic polyisocyanate sufficient to promote substantially equal access of reactants (ii)–(iv) to isocyanate groups;
    (ii) active hydrogen-containing material;
    (iii) difunctional sterically hindered amine having the general formula

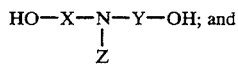

(iv) internal emulsifier having the general formula

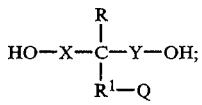

(B) chain-extending monomer;
(C) organic compounds having a pKb of at most about 7; and
(D) silane coupling agent represented by the general formula $ASi(OR^2)_3$ and combinations thereof, the coupling agent present in an amount sufficient to partially crosslink the polyurethanes but insufficient to gel an aqueous dispersion of the reaction product of A, B, C, and D, wherein:
Q is a negatively charged moiety selected from $COO^-$ and $SO_4^{2-}$;
X, Y, Z, R, and $R^1$, are independently selected from the group consisting of cyclic and aliphatic organic radicals free of reactive functional groups, and with the provisos that
i. at least 75% of the Z groups have from about 4 to about 20 carbon atoms;
ii. R can be hydrogen;
iii. $R^1$ is not required if Q is $COO^-$; and
iv. X, Y, Z, R, and $R^1$ are independently selected from the group consisting of cyclic and aliphatic hydrocarbon moieties having from about 1 to about 20 carbon atoms;
A is an organic radical having a functional group reactive with isocyanate groups; and
$R^2$ is independently selected from $C_1$-$C_4$ alkyl radicals.

2. Polymer in accordance with claim 1 wherein said chain-extending monomer is a low molecular weight active hydrogen-containing compound having at least 2 active hydrogens per molecule and which constitutes at least about 20 weight percent of the polymer.

3. Polymer in accordance with claim 1 wherein the chain-extending monomer is selected from ethylenediamine, bis(aminopropyl)methylamine, cyclohexane dimethanol, 1,4-butanediol, or 1,6-hexanediol.

4. Polymer in accordance with claim 3 wherein the chain-extending monomer is ethylenediamine.

5. Polymer in accordance with claim 1 wherein the silane coupling agent is 3-aminopropyltrimethoxysilane.

6. An aqueous dispersion of the water dispersible, ungelled, polyurethane polymer of claim 1.

7. A coatable precursor formulation including the aqueous dispersion of claim 6 having plasticizer dispersed therein.

8. Coatable precursor formulation in accordance with claim 7 including materials selected from leveling agents, antifoam agents, and surfactants.

9. A coating having a glass transition temperature ($T_g$) no less than about 30° C., said coating made from the formulation of claim 1.

10. A coating having a glass transition temperature ($T_g$) no less than about 30° C., said coating made from the formulation of claim 8.

11. A batch method of making aqueous dispersible, ungelled, silane-terminated polyurethane compositions, the method including the steps of:
(a) forming a polymer composition, the polymer composition comprising a non-aqueous solvent and an isocyanate-terminated polyurethane polymer, the polymer formed by reacting in a non-aqueous solvent having a molar excess of polyisocyanate at a temperature less than about 90° C.
(i) a molar excess of organic polyisocyanate sufficient to promote substantially equal access of reactants (ii)-(v) to isocyanate groups;
(ii) active hydrogen-containing material;
(iii) difunctional sterically hindered amine having the general formula

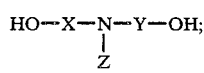

(iv) internal emulsifier having the general formula

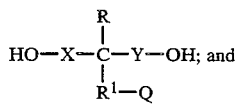

(b) combining the polymer composition formed in step (a) with an organic compound having a pKb of at most about 7 to form a neutralized polymer composition comprising the solvent and a neutralized polyurethane polymer; and
(c) combining the neutralized polymer composition with an amount of silane coupling agent represented by the general formula $ASi(OR^2)_3$, sufficient to partially crosslink the neutralized polyurethane polymer but insufficient to gel the composition wherein:

Q is a negatively charged moiety selected from $COO^-$ and $SO_4^{2-}$;
X, Y, Z, R, And $R^1$, are independently selected from the group consisting of cyclic and aliphatic organic radicals free of reactive functional groups, and with the provisos that
i. at least 75% of the Z groups have from about 4 to about 20 carbon atoms;
ii. R can be hydrogen;
iii. $R^1$ is not required if Q is $COO^-$; and
iv. X, Y, Z, R, and $R^1$ are independently selected from the group consisting of cyclic and aliphatic hydrocarbon moieties having from about 1 to about 20 carbon atoms;
A is an organic radical having a functional group reactive with isocyanate groups; and
$R^2$ is independently selected from $C_1$-$C_4$ alkyl radicals.

12. Method in accordance with claim 11 which further includes step (d) of adding sufficient water to form an aqueous dispersion of the partially crosslinked polyurethane composition.

13. Method in accordance with claim 11 which further includes adding a plasticizer to produce a coating precursor composition.

14. A quasi-continuous method of making an ungelled, aqueous dispersion of partially crosslinked silane-terminated polyurethanes, the method including the steps of:

(a) forming a prepolymer composition comprising non-aqueous solvent and an isocyanate-terminated polyurethane prepolymer by combining in a first continuously stirred vessel having an inert atmosphere:
  (i) a molar excess of organic polyisocyanate sufficient to promote substantially equal access of reactants (ii)–(iv) to isocyanate groups;
  (ii) active hydrogen-containing material;
  (iii) difunctional sterically hindered amine having the general formula

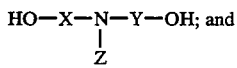

(iv) internal emulsifier having the general formula

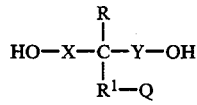

and a non-aqueous solvent to form an isocyanate-terminated polyurethane prepolymer;
  (b) forming a chain extender composition in a second vessel by combining water, chain-extending monomer, organic compound having a pKb of at most about 7, and an amount of silane coupling agent, represented by the general formula $ASi(OR^2)_3$, sufficient to partially crosslink the polyurethane polymers but insufficient to gel the resulting dispersion;
  (c) combining a continuous flow of the non-aqueous prepolymer contained in the first vessel with a continuous flow of the chain extender composition from the second vessel in a third vessel in the presence of agitation means, the agitation means being sufficient to form a dispersion of partially crosslinked polyurethane polymers;
  (d) recycling the dispersion of step (c) from the third vessel to the continuously stirred second vessel while maintaining flow from the first and second vessels to the third vessel; and
  (e) continuing the flow from the first and second vessels until the contents of the first vessel are exhausted wherein:
  Q is a negatively charged moiety selected from $COO^-$ and $SO_4^{2-}$;
  X, Y, Z, R, $R^1$, are independently selected from the group consisting of cyclic and aliphatic organic radicals free of reactive functional groups, and with the provisos that
  i. at least 75% of the Z groups have from about 4 to about 20 carbon atoms;
  ii. R can be hydrogen;
  iii. $R^1$ is not required if Q is $COO^-$; and
  iv. X, Y, Z, R, and $R^1$ are independently selected from the group consisting of cyclic and aliphatic hydrocarbon moieties having from about 1 to about 20 carbon atoms;
  A is an organic radical having a functional group reactive with isocyanate groups; and
  $R^2$ is independently selected from $C_1$–$C_4$ alkyl radicals.

* * * * *

UNITED STATES PATENT AND TRADEMARK OFFICE
CERTIFICATE OF CORRECTION

PATENT NO. : 5,354,808
DATED : October 11, 1994
INVENTOR(S) : Fidelis C. Onwumere et al It is certified that error appears in the above-indentified patent and that said Letters Patent is hereby corrected as shown below:

Col. 16, line 32, "(0,074 EQ)" should be --(0.074 EQ)--.

Col. 16, line 67, "(0,223 EQ)" should be --(0.223 EQ)--.

Co. 20, line 28, after the formula in (iv) and before paragraph (b) insert --(v) chain-extending monomer;--.

Col. 22, line 17, between "R," and "R$^1$" insert --and--.

Signed and Sealed this

Seventeenth Day of October, 1995

Attest:

BRUCE LEHMAN

*Attesting Officer*  *Commissioner of Patents and Trademarks*